United States Patent
Kandagadla et al.

(10) Patent No.: US 9,723,472 B2
(45) Date of Patent: Aug. 1, 2017

(54) TELESCOPIC TUNNELED DIRECT LINK SETUP DISCOVERY METHOD

(71) Applicant: QUALCOMM Incorporated, San Diego, CA (US)

(72) Inventors: Manohar Kandagadla, Hyderabad (IN); Naresh Kumar Gupta Varada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/715,947

(22) Filed: May 19, 2015

(65) Prior Publication Data
US 2016/0345154 A1 Nov. 24, 2016

(51) Int. Cl.
| | |
|---|---|
| *H04W 4/00* | (2009.01) |
| *H04W 8/00* | (2009.01) |
| *H04W 76/02* | (2009.01) |
| *H04W 84/12* | (2009.01) |

(52) U.S. Cl.
CPC ......... *H04W 8/005* (2013.01); *H04W 76/022* (2013.01); *H04W 76/023* (2013.01); *H04W 84/12* (2013.01)

(58) Field of Classification Search
None
See application file for complete search history.

(56) References Cited

U.S. PATENT DOCUMENTS

| | | |
|---|---|---|
| 2011/0103264 A1 | 5/2011 | Wentink |
| 2014/0071870 A1 | 3/2014 | Abraham et al. |
| 2014/0112194 A1* | 4/2014 | Novlan ................. H04W 8/005 370/254 |
| 2014/0242963 A1 | 8/2014 | Novlan et al. |
| 2014/0328168 A1 | 11/2014 | Park et al. |
| 2014/0341100 A1 | 11/2014 | Sun et al. |
| 2014/0357269 A1* | 12/2014 | Zhou .................... H04W 8/005 455/434 |
| 2015/0003327 A1 | 1/2015 | Seok et al. |

(Continued)

OTHER PUBLICATIONS

ISA/EP, International Search Report and Written Opinion of the International Searching Authority, Int'l. App. No. PCT/US2016/028783, Jun. 29, 2016, European Patent Office, Rijswijk, NL, 13 pgs.

*Primary Examiner* — Otis L Thompson, Jr.
(74) *Attorney, Agent, or Firm* — Holland & Hart LLP

(57) ABSTRACT

Methods, systems, and apparatuses for wireless communication are described at a device. A device may utilize telescopic discovery techniques to efficiently preserve a wireless connection until a previously connected device returns within range of the connection. In one example, the device may transmit a discovery request intended for the other device according to a first interval after determining the wireless connection. If a response is not received, the device may adjust the transmission interval to be a second interval. The device may then compare the second interval with a maximum interval to determine whether the second interval is greater than the maximum interval. If the second interval is less than the maximum the device may transmit a discovery request according to the second interval. Otherwise, the device may transmit discovery requests according to the maximum interval until a discovery response is received from the other device.

30 Claims, 13 Drawing Sheets

(56) References Cited

U.S. PATENT DOCUMENTS

2015/0023236 A1    1/2015  Choi et al.
2015/0319724 A1*  11/2015  Chae .................... H04W 8/005
                                                          370/315
2016/0100443 A1*   4/2016  Li ....................... H04W 76/021
                                                          370/338

* cited by examiner

TELESCOPIC TUNNELED DIRECT LINK SETUP DISCOVERY METHOD

BACKGROUND

Field of the Disclosure

The following relates generally to wireless communication, and more specifically to performing a telescopic tunneled direct link setup (TDLS) discovery method based on a TDLS communication failure.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Wireless Local Area Networks (WLANs), such as Wi-Fi (IEEE 802.11) networks are widely deployed and used. Other examples of such multiple-access systems may include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations or access points (APs), each simultaneously supporting communications for multiple mobile devices or stations (STAs), for example, in a particular WLAN. APs may communicate with STAs on downstream and upstream links. Each AP has a coverage range, which may be referred to as the coverage area of the cell. The STAs may also communicate with one another via direct communication links, such as through a TDLS. A TDLS connection may enable two STAs to directly communicate with one another instead of routing data through the AP, which may increase network capacity. A TDLS may additionally enable the two STAs to operate at higher rates that are supported by the STAs but not the AP.

After establishing a TDLS connection, a first STA and a second STA may begin direct communications. At some point in time, the second STA may exit TDLS communication range and the first STA may determine that the TDLS communication link has failed. The first STA may begin transmitting TDLS discovery requests to determine if the second STA has returned within range of the TDLS connection. The second STA may respond with a TDLS discovery response if it receives the TDLS discovery request so that TDLS communications may resume. In one approach, the first STA may transmit a maximum number of discovery requests. If no discovery response is received, the first STA may discontinue transmitting discovery requests. However, in this approach, the first STA and the second STA may fail to re-establish the TDLS connection even after the second STA returns within range. In a second approach, the first STA may indefinitely transmit discovery requests until a discovery response is received. In this approach, the first STA may experience significant power loss until the second STA returns within range.

SUMMARY

A device may utilize telescopic discovery techniques to efficiently preserve a wireless connection until a previously connected device returns within range of the connection. In one example, the device may transmit a discovery request intended for the other device according to a first interval after determining the wireless connection. If a response is not received, the device may adjust the transmission interval to be a second interval. The device may then compare the second interval with a maximum interval to determine whether the second interval is greater than the maximum interval. If the second interval is less than the maximum the device may transmit a discovery request according to the second interval. Otherwise, the device may transmit discovery requests according to the maximum interval until a discovery response is received from the other device.

A method of wireless communication is described. The method may include establishing, at a first device, a device-to-device wireless connection with a second device, transmitting a first discovery request at a first transmission interval, determining whether a discovery response to the first discovery request is received from the second device, and adjusting the first transmission interval to a second transmission interval based at least in part on the determination.

An apparatus for wireless communication is described. The apparatus may include a communications manager for establishing a device-to-device wireless connection with a second device, a transmitter for transmitting a first discovery request at a first transmission interval, a communications manager for determining whether a discovery response to the first discovery request is received from the second device, and an interval adjuster for adjusting the first transmission interval to a second transmission interval based at least in part on the determination.

A further apparatus for wireless communication is described. The apparatus may include a processor, memory in electronic communication with the processor, and instructions stored in the memory and operable, when executed by the processor, to cause the apparatus to establish a device-to-device wireless connection with a second device, transmit a first discovery request at a first transmission interval, determine whether a discovery response to the first discovery request is received from the second device, and adjust the first transmission interval to a second transmission interval based at least in part on the determination.

A non-transitory computer-readable medium storing code for wireless communication is described. The code may include instructions executable to establish a device-to-device wireless connection with a second device, transmit a first discovery request at a first transmission interval, determine whether a discovery response to the first discovery request is received from the second device, and adjust the first transmission interval to a second transmission interval based at least in part on the determination.

In some examples of the method, apparatuses, or non-transitory computer-readable medium described herein, the device-to-device wireless connection comprises a tunneled direct link setup (TDLS) connection. Additionally or alternatively, some examples may include processes, features, means, or instructions for comparing the second transmission interval with a maximum transmission interval.

Some examples of the method, apparatuses, or non-transitory computer-readable medium described herein may further include processes, features, means, or instructions for determining the second transmission interval is less than the maximum interval based at least in part on the comparison, and transmitting a second discovery request at the second transmission interval based at least in part on the comparison. Additionally or alternatively, some examples may include processes, features, means, or instructions for determining the second transmission interval is greater than the maximum interval based at least in part on the comparison, and transmitting a second discovery request at the maximum transmission interval.

In some examples of the method, apparatuses, or non-transitory computer-readable medium described herein, the second transmission interval is a multiple of the first transmission interval. Additionally or alternatively, in some examples the adjusting the first transmission interval is based at least in part on determining the discovery response is not received.

Some examples of the method, apparatuses, or non-transitory computer-readable medium described herein may further include processes, features, means, or instructions for determining the second device is out of a signaling range of the first device. Additionally or alternatively, in some examples the transmitting the first discovery request is based at least in part on determining the second device is out of the signaling range of the first device.

In some examples of the method, apparatuses, or non-transitory computer-readable medium described herein, the first device and the second device are mobile stations (STAs). Additionally or alternatively, in some examples the first device and the second device operate within a wireless local area network (WLAN).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

According to the present disclosure, a device may utilize telescopic discovery techniques to efficiently preserve a wireless connection until a previously connected device returns within range of the connection. Aspects of the disclosure are described in the context of a wireless communications system. For example, a device may transmit TDLS discovery requests at adjusted intervals until a discovery response is received. The device may determine that an adjusted interval is greater than a maximum interval, and transmit discovery requests at the maximum interval until a discovery response is received. These, and other aspects of the disclosure, are further illustrated by and described with reference to apparatus diagrams, system diagrams, and flowcharts.

Figure 1:
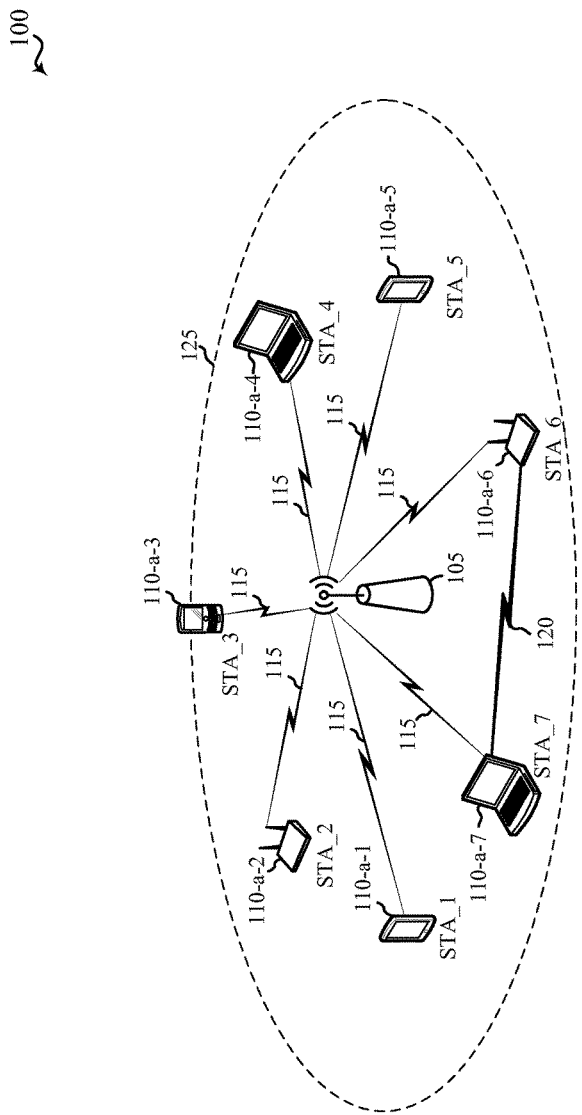
FIG. 1 illustrates an example of a network, such as a wireless local area network (WLAN), for telescopic TDLS discovery bursting in accordance with various aspects of the present disclosure.

FIG. 1 illustrates an example of a network, such as a wireless local area network (WLAN), for telescopic TDLS discovery bursting in accordance with various aspects of the present disclosure. The network 100 may include an access point (AP) 105 and wireless stations (STAs 110) labeled as STA_1 through STA_7. The wireless devices 110 may include mobile handsets, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the network 100 may have multiple APs 105. Each of the STAs 110, which may also be referred to as a wireless station, a mobile station (MS), a mobile device, an access terminal (AT), a user equipment (UE), a subscriber station (SS), or a subscriber unit, may associate and communicate with an AP 105 via a communication link 115. Each AP 105 has a coverage area 125 such that STAs 110 within that area can typically communicate with the AP 105. The STAs 110 may be dispersed throughout the coverage area 125. Each STA 110 may be stationary or mobile.

Although not shown in FIG. 1, a STA 110 can be covered by more than one AP 105 and can therefore associate with multiple APs 105 at different times. A single AP 105 and an associated set of stations may be referred to as a basic service set (BSS). An extended service set (ESS) is a set of connected BSSs. A distribution system (DS) (not shown) is used to connect APs 105 in an extended service set. A coverage area 125 for an AP 105 may be divided into sectors making up only a portion of the coverage area (not shown). The network 100 may include APs 105 of different types (e.g., metropolitan area, home network, etc.), with varying sizes of coverage areas and overlapping coverage areas for different technologies. Although not shown, other wireless devices can communicate with the AP 105.

While the STAs 110 may communicate with each other through the AP 105 using communication links 115, each STA 110 may also communicate directly with other STAs 110 via a direct wireless communication link 120. Two or more STAs 110 may communicate via a direct wireless communication link 120 when both STAs 110 are in the AP coverage area 125, when one STA 110 is within the AP coverage area 125, or when neither of the STAs 110 are within the AP coverage area 125 (not shown). Examples of direct wireless communication links 120 may include Wi-Fi Direct connections, connections established by using a Wi-Fi TDLS link, and other P2P group connections. The STAs 110 and APs 105 in these examples may communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, etc. In other implementations, other peer-to-peer connections or ad hoc networks may be implemented in network 100.

A network 100, such as a WLAN network, may utilize a TDLS link to increase throughput and network capacity. For instance, a first STA 110-*a*-1 may establish a TDLS link with a second STA 110-*a*-2 to efficiently stream media, transfer files, back up data, and the like. A TDLS link may be a direct link between at least two STAs 110, and may allow the two STAs 110 to bypass the serving AP 105. The STAs 110 may therefore operate according to shared capabilities and not be limited by capabilities of the AP 105. For instance, if both STAs 110 are more advanced than the AP 105, they may still operate at advanced levels despite the reduced functionality of AP 105. Therefore, the STAs 110 may operate at higher throughputs than originally provided by the network. The TDLS direct link may additionally increase network capacity. In the absence of a TDLS link, the first STA 110-*a*-1 may send a data packet to an AP 105, which the AP 105 may then forward to the second STA 110-*a*-2. Therefore, two data packets (i.e., one data packet from the first STA 110-*a*-1 to the AP 105 and another from the AP 105 to the second STA 110-*a*-2) may be sent to send the original data packet intended for the second STA 110-*a*-2. Accordingly, a TDLS link may decrease the number of packets traveling throughout the network 100 and increase overall capacity.

A TDLS link may be configured using TDLS discovery and setup procedures. The setup procedure may also be initiated without the discovery process. A first STA 110-*a*-1 may send a TDLS discovery request to a second STA 110-*a*-2. The second STA 110-*a*-2 may respond to the first STA 110-*a*-1 with a discovery response. The discovery response may include capability information for the receiving device and may be analyzed by the first STA 110-*a*-1. The first STA 110-*a*-1 may use the capability information and signal measurements, such as a received signal strength indication (RSSI), to determine if a TDLS link should be established. For instance, the first STA 110-*a*-1 may determine if a TDLS link will provide efficiency improvements for network 100 before initiating the TDLS connection. The first STA 110-*a*-1 may then send a TDLS setup request, tunneled through the AP 105 (i.e., the AP 105 will not be aware that the data packet is a TDLS packet), to the second STA 110-*a*-2. The TDLS setup request may include capability information for the first STA 110-*a*-1. The second STA 110-*a*-2 may respond to the setup request with a TDLS setup response, which may also be tunneled through the AP 105, along with capability information and an indication whether the setup request has been accepted. The first STA 110-*a*-1 may then respond with a TDLS confirmation frame and the two STAs (i.e., the first station 110-*a*-1 and the second station 110-*a*-2) may begin direct communication.

At a later point in time, either of the STAs 110 (e.g., the second STA 110-*a*-2) may leave the range of the TDLS link and the remaining STA 110 (e.g., the first STA 110-*a*-1) may determine that the TDLS link has failed. The first STA 110-*a*-1 may attempt to re-establish the TDLS link with the second STA 110-*a*-2. In one approach, the first STA 110-*a*-1 may transmit a first discovery request. If a discovery response is not received from the second STA 110-*a*-2, the first STA 110-*a*-1 may continue transmitting discovery requests until a maximum number of attempts has been reached, at which point the first STA 110-*a*-1 may cease transmitting discovery requests. Therefore, even if the second STA 110-*a*-2 returns within range of the TDLS link, the TDLS connection will not be re-established. In a second approach, the first STA 110-*a*-1 may transmit an indefinite number of discovery requests until the second STA 110-*a*-2 returns within range of the TDLS link. In this case, the two STAs 110 may resume direct communications when the second STA 110-*a*-2 returns within range; however, the first STA 110-*a*-1 may incur significant power expenditures.

A first STA 110-*a*-1 may, therefore, utilize telescopic discovery techniques to increase power efficiency, while preserving a wireless connection until the second STA 110-*a*-2 returns. In one example, the first STA 110-*a*-1 may transmit a discovery request to the second STA 110-*a*-2 according to a first interval. If a response is not received, the first STA 110-*a*-1 may adjust the transmission interval to be a second interval. The first STA 110-*a*-1 may then compare the second interval with a maximum interval to determine whether the second interval is greater than the maximum interval. If the second interval is less than the maximum, the first STA 110-*a*-1 may transmit a discovery request according to the second interval. Otherwise, the first STA 110-*a*-1 may transmit discovery requests according to the maximum interval until a discovery response is received from the second STA 110-*a*-2.

Figure 2:
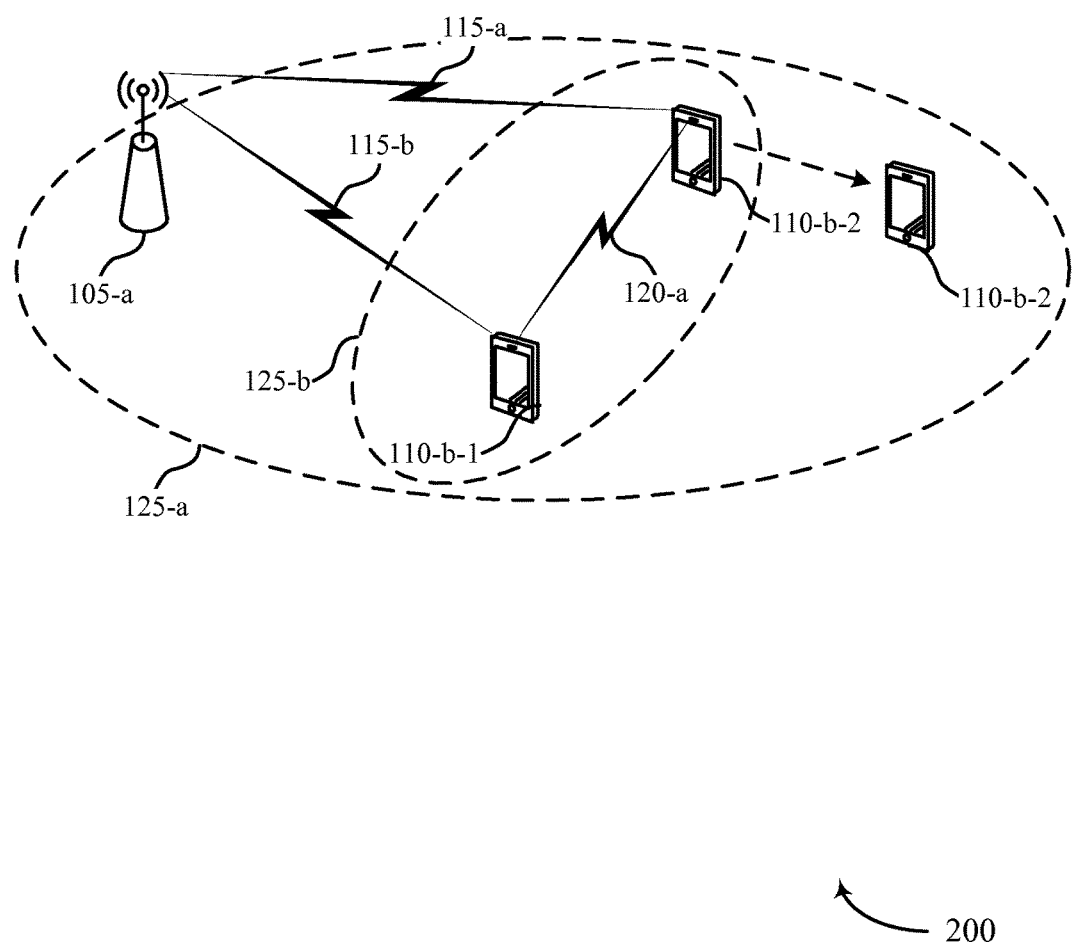
FIG. 2 illustrates an example of a wireless communications subsystem for telescopic TDLS discovery in accordance with various aspects of the present disclosure.

FIG. 2 illustrates an example of a wireless communications subsystem 200 for telescopic TDLS discovery in accordance with various aspects of the present disclosure. Wireless communications subsystem 200 may include first STA 110-*b*-1, second STA 110-*b*-2, and AP 105-*a*, which may be examples of a STA 110 or an access point 105. AP 105-*a* may communicate with STAs 110-*b*-1 and 110-*b*-2 via communication links 115-*a* and 115-*b* when STAs 110-*b*-1 and 110-*b*-2 are within coverage area 125-*a*, as generally described above with reference to FIG. 1.

In one example, AP 105-*a* may establish communication links 115-*a* and 115-*b* with STAs 110-*b*-1 and 110-*b*-2. First STA 110-*b*-1 and second STA 110-*b*-2 may additionally establish direct wireless communication link 120-*a*, which may be a TDLS connection. The STAs 110-*b*-1 and 110-*b*-2 may use the TDLS connection to bypass AP 105-*a* and to transfer data directly between one another. The TDLS connection may have a TDLS coverage area 125-*b* in which STAs 110-*b*-1 and 110-*b*-2 may communicate. Second STA 110-*b*-2 may leave the coverage area and the TDLS connection between the two STAs 110-*b*-1 and 110-*b*-2 may fail. First STA 110-*b*-1 may determine that second STA 110-*b*-2 has left the TDLS coverage area 125-*b* and may transmit a first discovery request according to a first interval. For example, first STA 110-*b*-1 may wait 1 ms to transmit a discovery request after determining that the TDLS has failed. If no discovery response is received, first STA 110-*b*-1 may adjust a subsequent transmission interval to a second interval (e.g., 2 ms). The second interval may be determined based on the first interval and in some cases may be a multiple of the first interval.

First STA 110-*b*-1 may compare the second interval against a maximum interval. The maximum interval may be a pre-determined interval that is configured to increase power efficiency for first STA 110-*b*-1 (e.g., 100 ms, 1 sec, etc.). If the second interval is greater than the maximum interval, first STA 110-*b*-1 may transmit discovery request at the maximum interval until a discovery response is received from second STA 110-*b*-2. Otherwise, first STA 110-*b*-1 may transmit a subsequent discovery request at the second interval. If the subsequent discovery request fails, first STA 110-*b*-1 may adjust the transmission interval to a third interval, compare the third interval against the maximum interval, and so on and so forth. Second STA 110-*b*-2 may move back into the TDLS coverage area 125-*b* and receive a discovery request from first STA 110-*b*-1. Second STA 110-*b*-2 may respond to the discovery request with a discovery response and the TDLS connection between first STA 110-*b*-1 and second STA 110-*b*-2 may be re-established.

Figure 3:
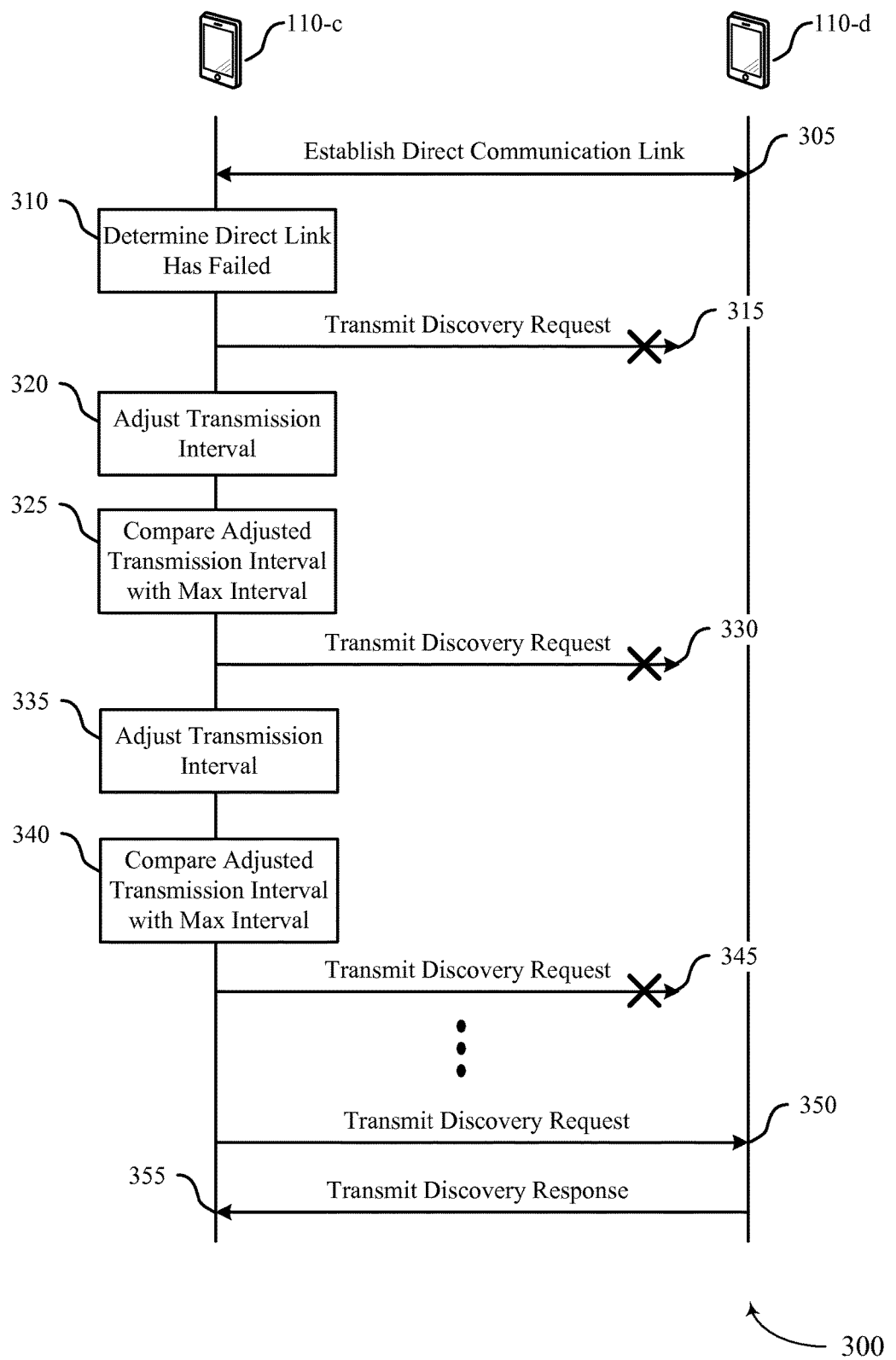
FIG. 3 illustrates an example of a process flow for telescopic TDLS discovery in accordance with various aspects of the present disclosure.

FIG. 3 illustrates an example of a process flow 300 for telescopic TDLS discovery in accordance with various aspects of the present disclosure. Process flow 300 may be performed by first STA 110-*c* and second STA 110-*d*, which may be examples of a STA 110 described above with reference to FIGS. 1-2. In some examples, first STA 110-*c* may adjust a transmission interval for transmitting discovery requests intended for second STA 110-*d*. First STA 110-*c* may compare the adjusted transmission interval with a maximum transmission interval and transmit subsequent discovery requests based on the comparison.

At step 305, first STA 110-*c* may establish a direct communication link with second STA 110-*d*. After establishing the direct communication link, first STA 110-*c* and second STA 110-*d* may exchange data directly with one another without routing the data through an AP 105. The direct communication link may be a wireless TDLS connection.

At step 310, first STA 110-*c* may determine the direct link with second STA 110-*d* has failed. First STA 110-*c* may determine the direct link has failed based on determining that second STA 110-*d* is not in range of the TDLS connection. First STA 110-*c* may also determine the direct link has failed based on a transmission failure. At step 315, first STA 110-*c* may transmit a first discovery request at a first transmission interval based on determining the direct link has failed.

At step 320, first STA 110-*c* may adjust the transmission interval to a second interval based on determining second STA 110-*d* has not responded to the discovery request. Adjusting the transmission interval may be done either linearly or exponentially. For instance, the second interval may be a multiple of the first interval. At step 325, first STA 110-*c* may compare the second interval with a maximum interval. First STA 110-*c* may determine the second interval is less than the maximum interval.

At step 330, first STA 110-*c* may transmit a second discovery request based on the comparison. Accordingly, first STA 110-*c* may transmit the second discovery request according to the second interval.

At step 335, first STA 110-*c* may adjust the transmission interval to a third interval based on determining second STA 110-*d* has not responded to the discovery request. The third interval may be a multiple of the first interval, the second interval or both. At step 340, first STA 110-*c* may compare the third interval with the maximum interval. First STA 110-*c* may determine the third interval is greater than the maximum interval.

At step 345, first STA 110-*c* may transmit a third discovery request based on the comparison. Accordingly, first STA 110-*c* may transmit the third discovery request according to the maximum interval. First STA 110-*c* may continue to transmit subsequent discovery requests at the maximum interval until a discovery response is received from second STA 110-*d*. At step 350, second STA 110-*d* may return within range of the TDLS link and receive the discovery request.

At step 355, first STA 110-*c* may receive a discovery response from second STA 110-*d*. First STA 110-*c* and second STA 110-*d* may then resume exchanging data through the direct link. In other cases, first STA 110-*c* may leave the coverage area of the direct link and second STA 110-*d* may similarly enter the telescopic discovery mode until first STA 110-*c* returns within coverage.

Figure 4:
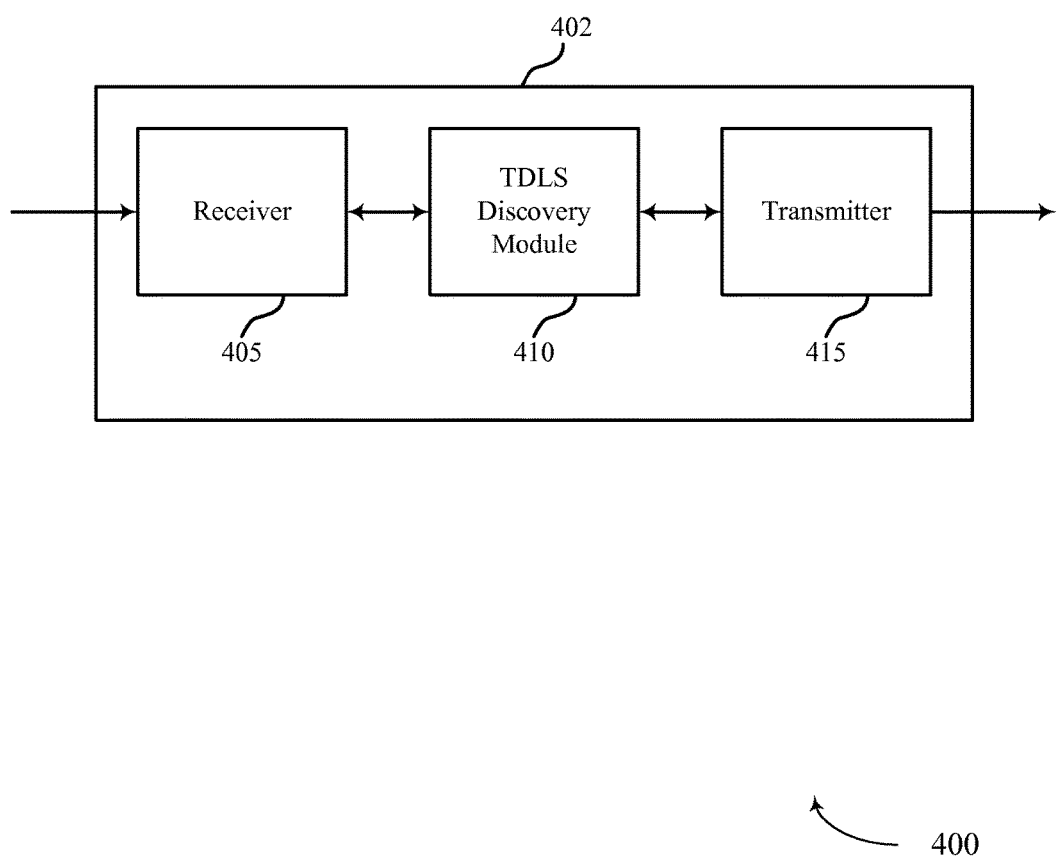
FIGS. 4-5 show block diagrams of a wireless device for telescopic TDLS discovery in accordance with various aspects of the present disclosure.

FIG. 4 shows a block diagram 400 of a wireless device 402 configured for telescopic TDLS discovery in accordance with various aspects of the present disclosure. Wireless device 402 may be an example of aspects of a STA 110 described with reference to FIGS. 1-3. Wireless device 402 may include a receiver 405, a TDLS discovery module 410, and a transmitter 415. Wireless device 402 may also include a processor. Each of these components may be in communication with each other.

The components of wireless device 402 may, individually or collectively, be implemented with an application specific integrated circuit (ASIC) adapted to perform some or all of the applicable functions in hardware. Alternatively, the functions may be performed by other processing units (or cores), on an IC. Other types of integrated circuits may also be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by general or application-specific processors. For example, the receiver 405 may be a hardware receiver, the transmitter 415 may be a hardware transmitter, and the TDLS discovery module 410 may be a processor and memory to process and store, respectively, the computer readable medium embodying the actions to be taken by the device to manage the burst traffic.

The receiver 405 may receive information such as packets, user data, or control information associated with various information channels (e.g., control channels, data channels, and information related to telescopic TDLS discovery method, etc.). Information may be passed on to the TDLS discovery module 410, and to other components of wireless device 402.

The TDLS discovery module 410 may establish a device-to-device wireless connection with a second device, transmit a first discovery request at a first transmission interval, determine whether a discovery response to the first discovery request is received from the second device, and adjust the first transmission interval to a second transmission interval based at least in part on the determination.

The transmitter 415 may transmit signals received from other components of wireless device 402. The transmitter 415 may be collocated with the receiver 405 in a transceiver module. The transmitter 415 may include a single antenna, or it may include a plurality of antennas. The transmitter 415 may transmit a first discovery request at a first transmission interval. The transmitter 415 may transmit a second discovery request at the second transmission interval based at least in part on a comparison of the first transmission interval and a maximum transmission interval. The transmitter 415 may transmit a second discovery request at the maximum transmission interval.

Figure 5:
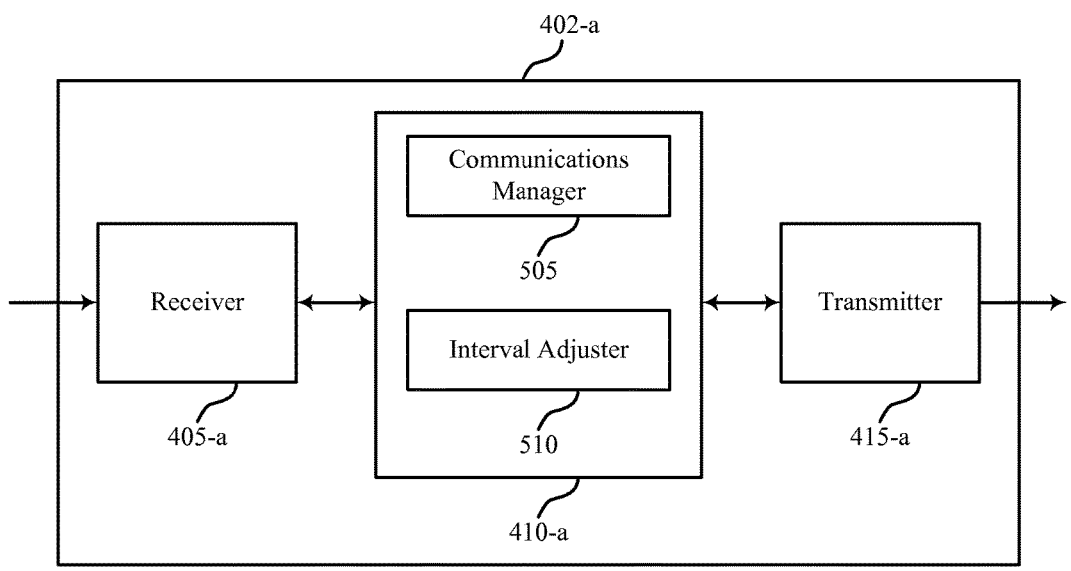

FIG. 5 shows a block diagram 500 of a wireless device 402-*a* for telescopic TDLS discovery in accordance with various aspects of the present disclosure. Wireless device 402-*a* may be an example of aspects of a wireless device 402 or a STA 110 described with reference to FIGS. 1-4. Wireless device 402-a may include a receiver 405-a, a TDLS discovery module 410-a, or a transmitter 415-a. Wireless device 402-a may also include a processor. Each of these components may be in communication with each other. The TDLS discovery module 410-a may also include a communications manager 505, and an interval adjuster 510.

The receiver 405-a may receive information which may be passed on to TDLS discovery module 410-a, and to other components of wireless device 402-a. The TDLS discovery module 410-a may perform the operations described with reference to FIG. 4. The transmitter 415-a may transmit signals received from other components of wireless device 402-a.

The communications manager 505 may establish a device-to-device wireless connection with a second device as described with reference to FIGS. 2-3. The communications manager 505 may also determine whether a discovery response to the first discovery request is received from the second device. The device-to-device wireless connection may comprise a TDLS connection. Transmitting the first discovery request may be based at least in part on determining the second device may be out of the signaling range of the first device. The first device and the second device may be mobile stations (STAs). The first device and the second device may operate within a wireless local area network (WLAN).

The interval adjuster 510 may adjust the first transmission interval to a second transmission interval based at least in part on the determination as described with reference to FIGS. 2-3. The second transmission interval may be a multiple of the first transmission interval. Adjusting the first transmission interval may be based at least in part on determining the discovery response is not received.

Figure 6A:
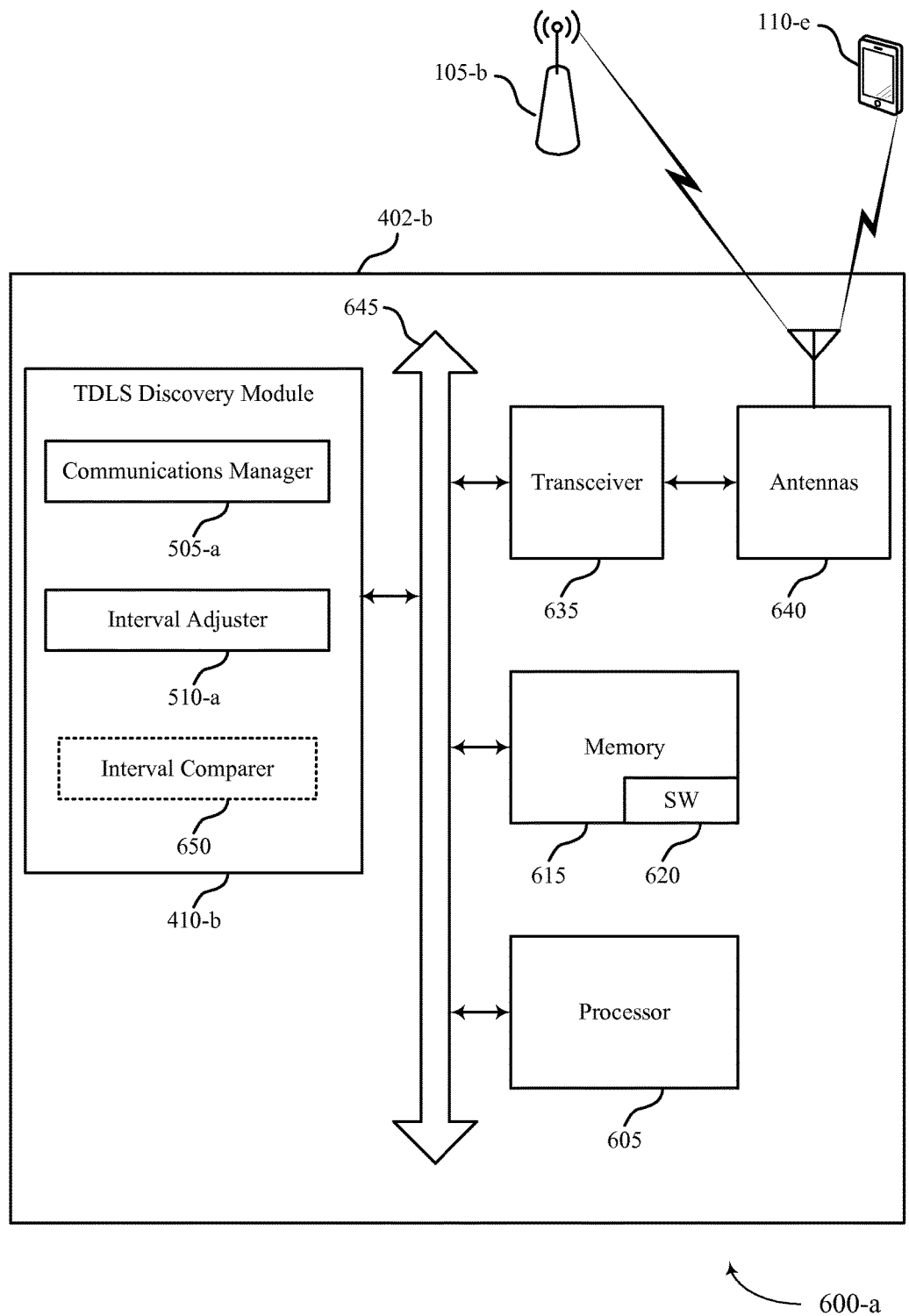
FIGS. 6A-7B show diagrams of systems including a wireless device for telescopic TDLS discovery in accordance with various aspects of the present disclosure.

FIG. 6A shows a diagram of a system 600-a including a wireless device 402-b configured for telescopic TDLS discovery in accordance with various aspects of the present disclosure. The system 600-a may include a wireless device 402-b, which may be an example of a wireless device 402 or STA 110 described above with reference to FIGS. 1-5. The wireless device 402-b may include a TDLS discovery module 410-b. The TDLS discovery module 410-b may be an example of aspects of a TDLS discovery module 410 described with reference to FIGS. 4-5. The TDLS discovery module 410-b may include a communications manager 505-a, and an interval adjuster 510-a. Each of these modules may perform the functions described with reference to FIG. 5. The TDLS discovery module 410-b may also include an interval comparer 650. The wireless device 402-b may also include components for bi-directional voice and data communications including components for transmitting communications and components for receiving communications. For example, wireless device 402-b may communicate bi-directionally with STA 110-e or AP 105-b.

The wireless device 402-b may include a processor 605, and memory 615 (storing software (SW)) 620, a transceiver 635, and antenna(s) 640, each of which may communicate, directly or indirectly, with one another (e.g., via buses 645). The transceiver 635 may communicate bi-directionally, via the antenna(s) 640 or wired or wireless links, with networks, as described above. For example, the transceiver 635 may communicate bi-directionally with an AP 105 or another STA 110. The transceiver 635 may include a modem to modulate the packets and provide the modulated packets to the antenna(s) 640 for transmission, and to demodulate packets received from the antenna(s) 640. While the wireless device 402-b may include a single antenna 640, the wireless device 402-b may also have multiple antennas 640 capable of concurrently transmitting or receiving multiple wireless transmissions.

The memory 615 may include random access memory (RAM) and read only memory (ROM). The memory 615 may store computer-readable, computer-executable software/firmware code 620 including instructions that, when executed, cause the processor 605 to perform various functions described herein (e.g., adaptive short inter-frame space bursting, etc.). Alternatively, the computer-executable software/firmware code 620 may not be directly executable by the processor 605 but cause a computer (e.g., when compiled and executed) to perform functions described herein. The processor 605 may include an intelligent hardware device, (e.g., a central processing unit (CPU), a microcontroller, an ASIC, etc.).

The communications manager 505-a, interval adjuster 510-a, and interval comparer 650 may, individually or collectively, be implemented with an ASIC adapted to perform some or all of the applicable functions in hardware. Alternatively, the functions of these components may be performed by other processing units (or cores), on an IC. Other types of integrated circuits may also be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by general or application-specific processors.

The interval comparer 650 may compare the second transmission interval with a maximum transmission interval as described with reference to FIGS. 2-3. The interval comparer 650 may also determine the second transmission interval is less than the maximum interval based at least in part on the comparison. The interval comparer 650 may also determine the second transmission interval is greater than the maximum interval based at least in part on the comparison. The interval comparer 650 may also determine the second device is out of a signaling range of the first device.

Figure 6B:
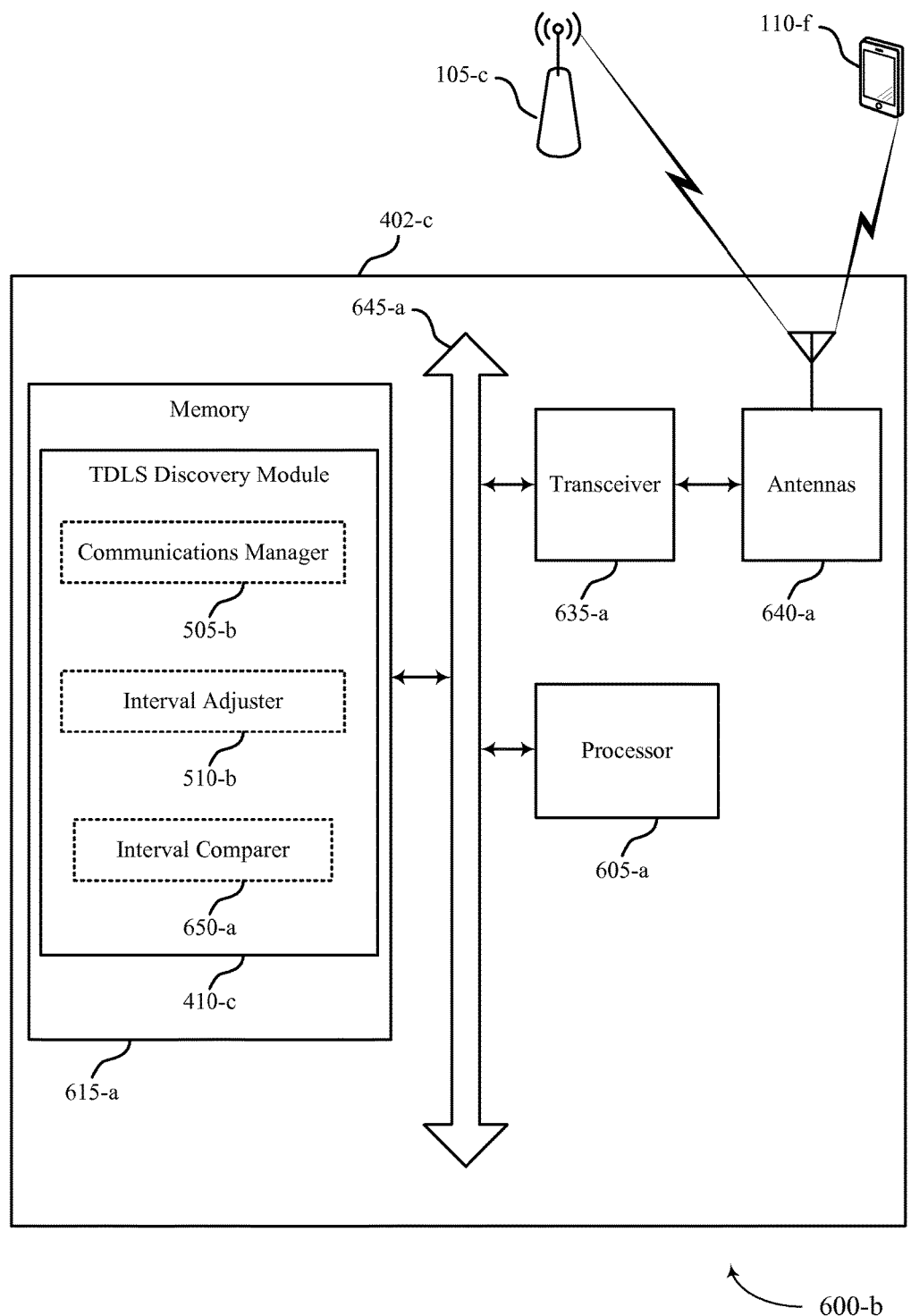

FIG. 6B shows a diagram of a system 600-b including a wireless device 402-c configured for telescopic TDLS discovery in accordance with various aspects of the present disclosure. The system 600-b may include a wireless device 402-c, which may be an example of a wireless device 402 or STA 110 described above with reference to FIGS. 1-6A. The wireless device 402-c may include a TDLS discovery module 410-c. The TDLS discovery module 410-c may be an example of aspects of a TDLS discovery module 410 described with reference to FIGS. 4-6A. The TDLS discovery module 410-c may include a communications manager 505-b, and an interval adjuster 510-b. Each of these modules may perform the functions described with reference to FIGS. 5-6A. The TDLS discovery module 410-c may also include an interval comparer 650-a. The wireless device 402-c may also include components for bi-directional voice and data communications including components for transmitting communications and components for receiving communications. For example, wireless device 402-c may communicate bi-directionally with STA 110-f or AP 105-c.

The wireless device 402-c may include a processor 605-a, and memory 615-a (storing software (SW)), a transceiver 635-a, and antenna(s) 640-a, each of which may communicate, directly or indirectly, with one another (e.g., via buses 645-a). The transceiver 635-a may communicate bi-directionally, via the antenna(s) 640-a or wired or wireless links, with networks, as described above. For example, the transceiver 635-a may communicate bi-directionally with an AP 105 or another STA 110. The transceiver 635-a may include a modem to modulate the packets and provide the modulated packets to the antenna(s) 640-a for transmission, and to demodulate packets received from the antenna(s) 640-a. While the wireless device 402-c may include a single antenna 640-a, the wireless device 402-c may also have multiple antennas 640-a capable of concurrently transmitting or receiving multiple wireless transmissions.

The memory 615-a may include random access memory (RAM) and read only memory (ROM). The memory 615-a may store computer-readable, computer-executable software/firmware code including instructions that, when executed, cause the processor 605-a to perform various functions described herein (e.g., adaptive short inter-frame space bursting, etc.). Alternatively, the software/firmware code may not be directly executable by the processor 605-a but cause a computer (e.g., when compiled and executed) to perform functions described herein. The processor 605-a may include an intelligent hardware device, (e.g., a central processing unit (CPU), a microcontroller, an ASIC, etc.). In the example of FIG. 6B, the communications manager 505-a, interval adjuster 510-a, and interval comparer 650-a may be implemented as software/firmware code executable by the processor 605-a.

Figure 7A:
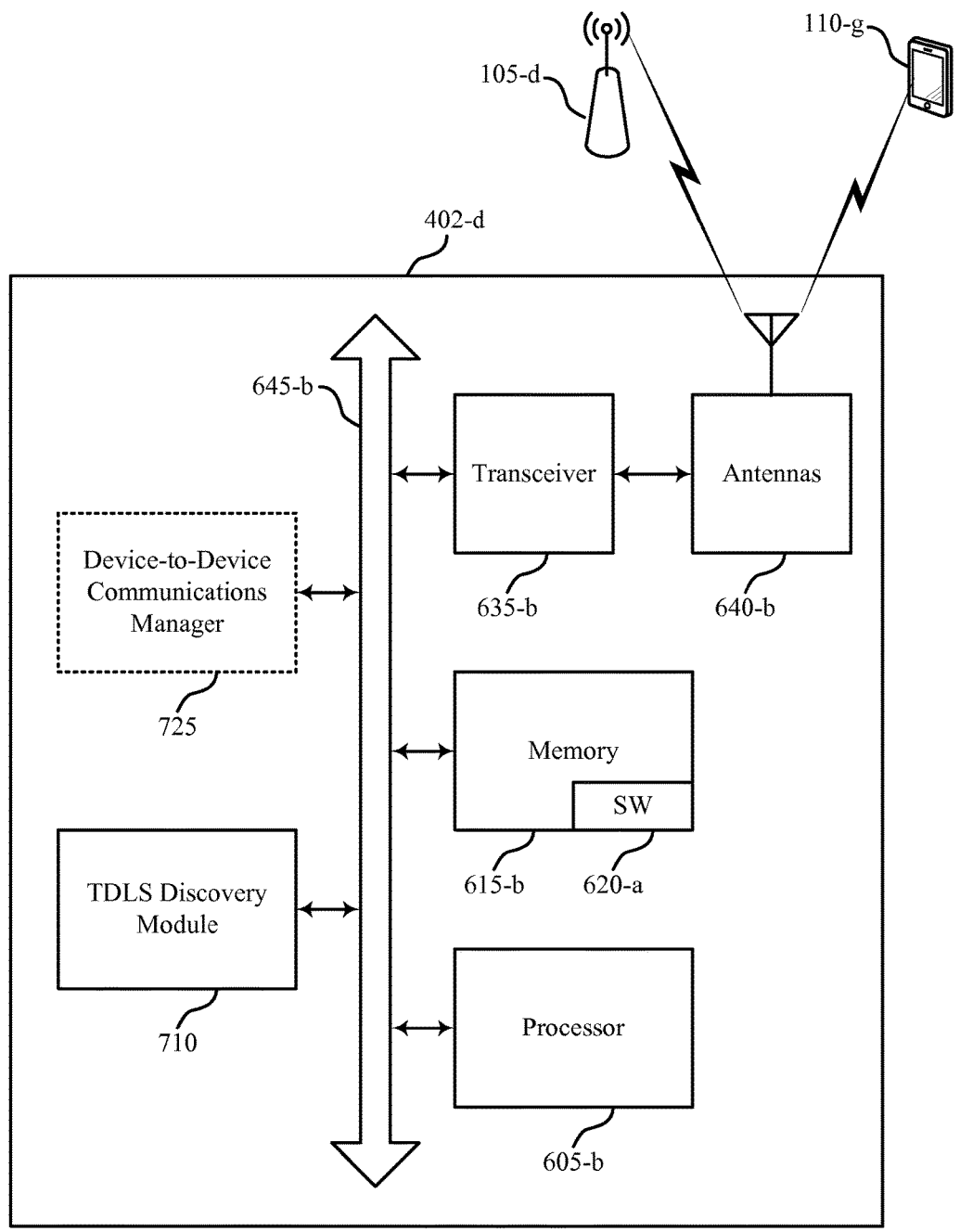

FIG. 7A shows a diagram of a system 700-a including a wireless device 402-d configured for telescopic TDLS discovery in accordance with various aspects of the present disclosure. The wireless device 402-d may be an example of a wireless device 402 or STA 110 described above with reference to FIGS. 1-6B. The wireless device 402-d may include a TDLS discovery module 710, which may be an example of the TDLS discovery module 710 described with reference to FIGS. 4-6B. Wireless device 402-d may also include a device-to-device communications manager 725. The wireless device 402-d may also include components for bi-directional voice and data communications including components for transmitting communications and components for receiving communications. For example, wireless device 402-d may communicate bi-directionally with AP 105-d or STA 110-g.

STA 110-g may also include a processor 605-b, and memory 615-b (including software (SW)) 620-a, a transceiver 635-b, and antenna(s) 640-b, each of which may communicate, directly or indirectly, with one another (e.g., via buses 645-b). The transceiver 635-b may communicate bi-directionally, via the antenna(s) 640-b or wired or wireless links, with networks, as described above. For example, the transceiver 635-b may communicate bi-directionally with a AP 105 or another STA 110. The transceiver 635-b may include a modem to modulate the packets and provide the modulated packets to the antenna(s) 640-b for transmission, and to demodulate packets received from the antenna(s) 640-b. While STA 110-g may include a single antenna 640-b, STA 110-g may also have multiple antennas 640-b capable of concurrently transmitting or receiving multiple wireless transmissions. The device-to-device communications manager 725 may configure a device to communicate directly with other devices. For instance, the device-to-device communications manager 725 may configure a device to communicate using a TDLS link.

The memory 615-b may include random access memory (RAM) and read only memory (ROM). The memory 615-b may store computer-readable, computer-executable software/firmware code 620-a including instructions that, when executed, cause the processor 605-b to perform various functions described herein (e.g., telescopic TDLS discovery method, etc.). Alternatively, the software/firmware code 620-a may not be directly executable by the processor 605-b but cause a computer (e.g., when compiled and executed) to perform functions described herein. The processor 605-b may include an intelligent hardware device, (e.g., a central processing unit (CPU), a microcontroller, an application specific integrated circuit (ASIC), etc.)

Figure 7B:
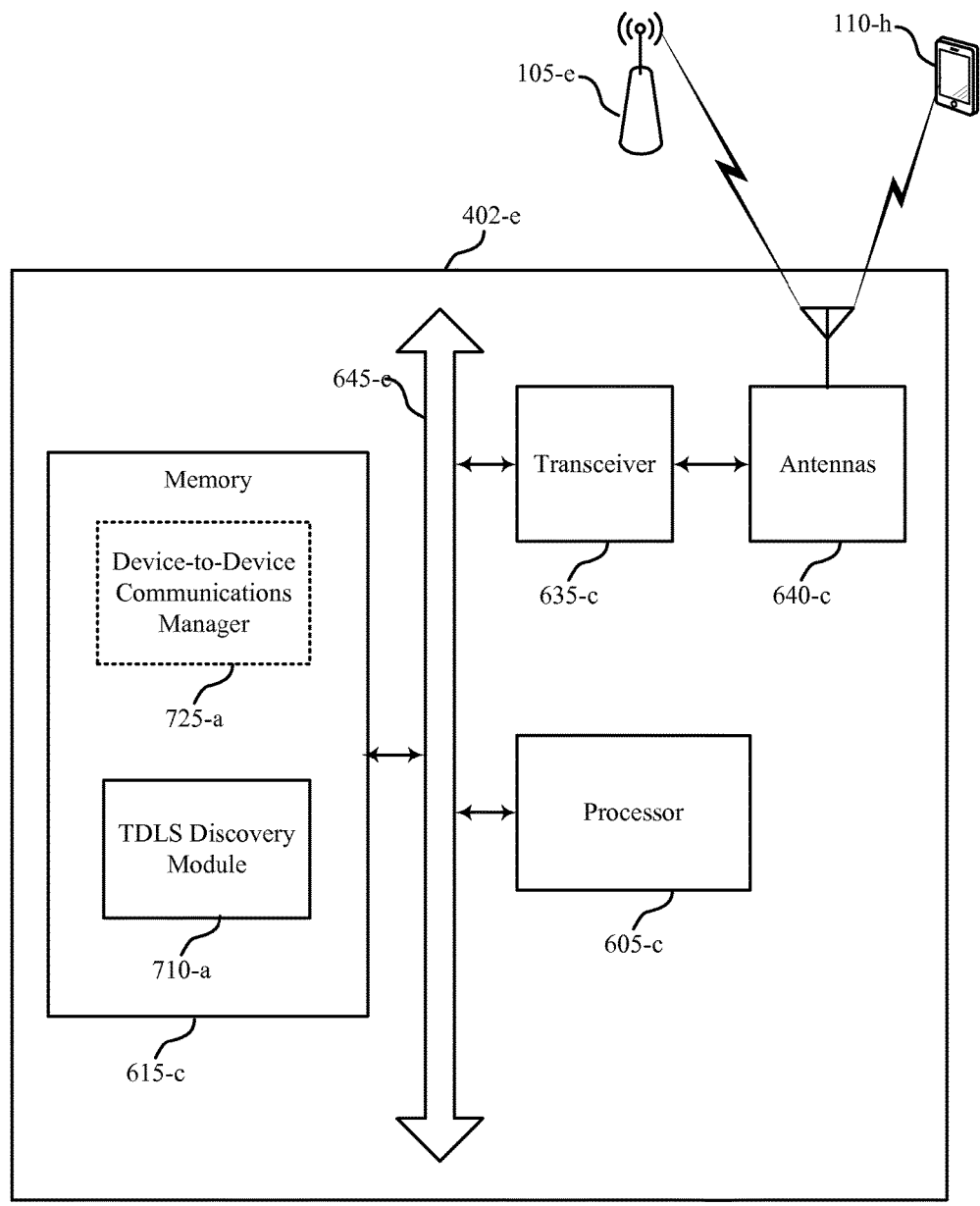

FIG. 7B shows a diagram of a system 700-b including a wireless device 402-e configured for telescopic TDLS discovery in accordance with various aspects of the present disclosure. The wireless device 402-e may be an example of a wireless device 402-e or STA 110 described above with reference to FIGS. 1-7A. The wireless device 402-e may include a TDLS discovery module 710-a, which may be an example of the TDLS discovery module 710-a described with reference to FIGS. 4-7A. Wireless device 402-e may also include a device-to-device communications manager 725-a. The wireless device 402-e may also include components for bi-directional voice and data communications including components for transmitting communications and components for receiving communications. For example, wireless device 402-e may communicate bi-directionally with AP 105-e or STA 110-h.

The wireless device 402-e may also include a processor 605-c, memory 615-c (storing software (SW)), a transceiver 635-c, and antenna(s) 640-c, each of which may communicate, directly or indirectly, with one another (e.g., via buses 645-c). The transceiver 635-c may communicate bi-directionally, via the antenna(s) 640-c or wired or wireless links, with networks, as described above. For example, the transceiver 635-c may communicate bi-directionally with an AP 105 or another STA 110. The transceiver 635-c may include a modem to modulate the packets and provide the modulated packets to the antenna(s) 640-c for transmission, and to demodulate packets received from the antenna(s) 640-c. While the wireless device 402-e may include a single antenna 640-c, the wireless device 402-e may also have multiple antennas 640-c capable of concurrently transmitting or receiving multiple wireless transmissions. The device-to-device communications manager 725-a may perform the functions described in FIG. 7A.

The memory 615-c may include random access memory (RAM) and read-only memory (ROM). The memory 615-c may store computer-readable, computer-executable software/firmware code including instructions that, when executed, cause the processor 605-c to perform various functions described herein (e.g., adaptive short inter-frame space bursting, etc.). Alternatively, the software/firmware code may not be directly executable by the processor 605-c but cause a computer (e.g., when compiled and executed) to perform functions described herein. The processor 605-c may include an intelligent hardware device, (e.g., a central processing unit (CPU), a microcontroller, an ASIC, etc.). In the example of FIG. 7B, the device-to-device communications manager 725-a and TDLS discovery module 710-a may be implemented as software/firmware code stored in the memory 615-c and executable by the processor 605-c.

Figure 8:
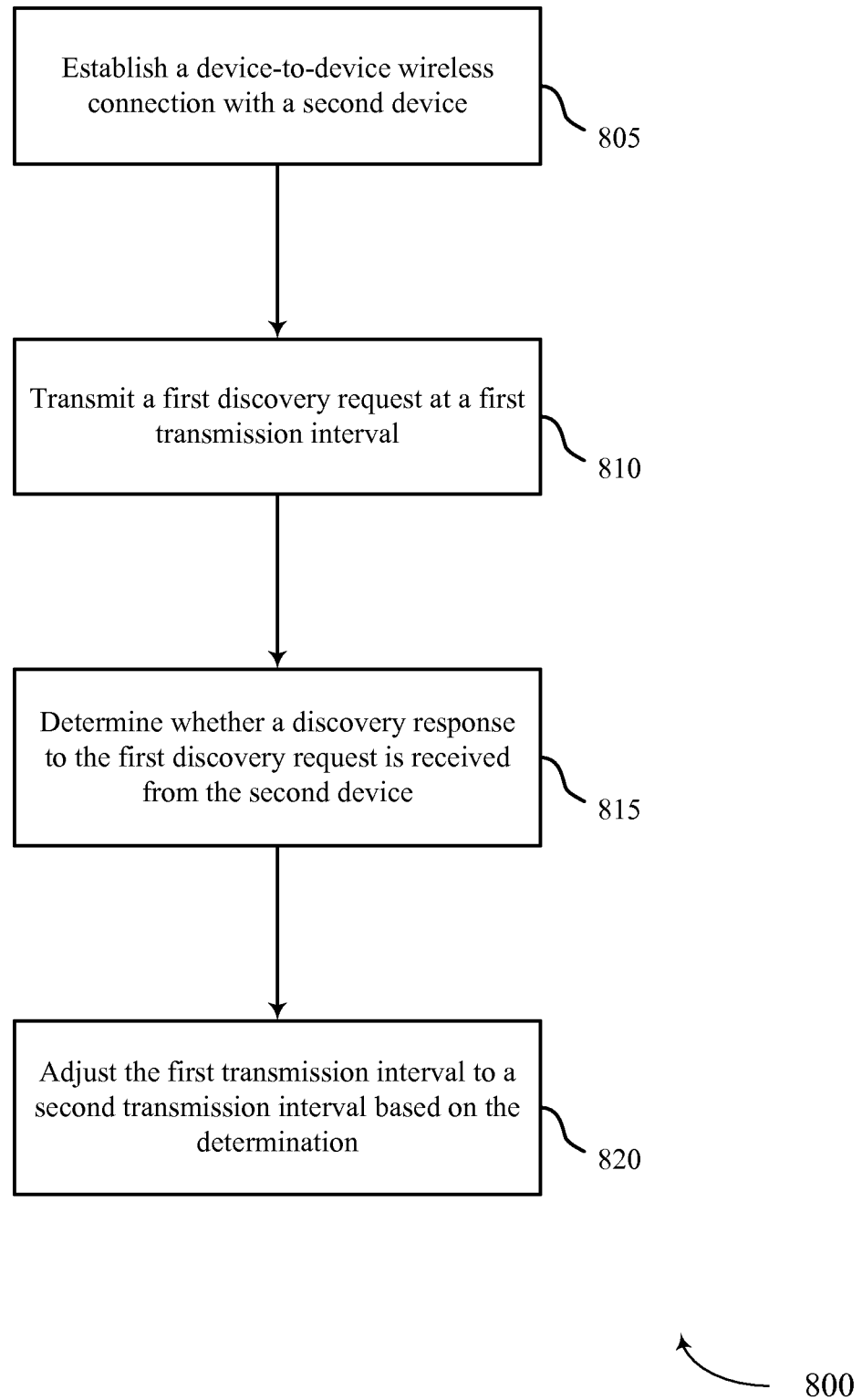
FIGS. 8-11 illustrate flow diagrams for telescopic TDLS discovery in accordance with various aspects of the present disclosure.

FIG. 8 shows a flowchart illustrating a method 800 for telescopic TDLS discovery in accordance with various aspects of the present disclosure. The operations of method 800 may be implemented by a STA 110 or its components as described with reference to FIGS. 1-7B. For example, the operations of method 800 may be performed by the TDLS discovery module 410 as described with reference to FIGS. 4-7B. A STA 110 may execute a set of codes to control the functional elements of the STA 110 to perform the functions described below. Additionally or alternatively, the STA 110 may perform aspects the functions described below using special-purpose hardware.

At block 805, the STA 110 may establish a device-to-device wireless connection with a second device as described with reference to FIGS. 2-3. The operations of block 805 may be performed by the communications manager 505 as described with reference to FIG. 5.

At block 810, the STA 110 may transmit a first discovery request at a first transmission interval as described with reference to FIGS. 2-3. The operations of block 810 may be performed by the transmitter 415 as described with reference to FIG. 4.

At block 815, the STA 110 may determine whether a discovery response to the first discovery request is received from the second device as described with reference to FIGS. 2-3. The operations of block 815 may be performed by the communications manager 505 as described with reference to FIG. 5.

At block 820, the STA 110 may adjust the first transmission interval to a second transmission interval based at least in part on the determination as described with reference to FIGS. 2-3. The operations of block 820 may be performed by the interval adjuster 510 as described with reference to FIG. 5.

Figure 9:
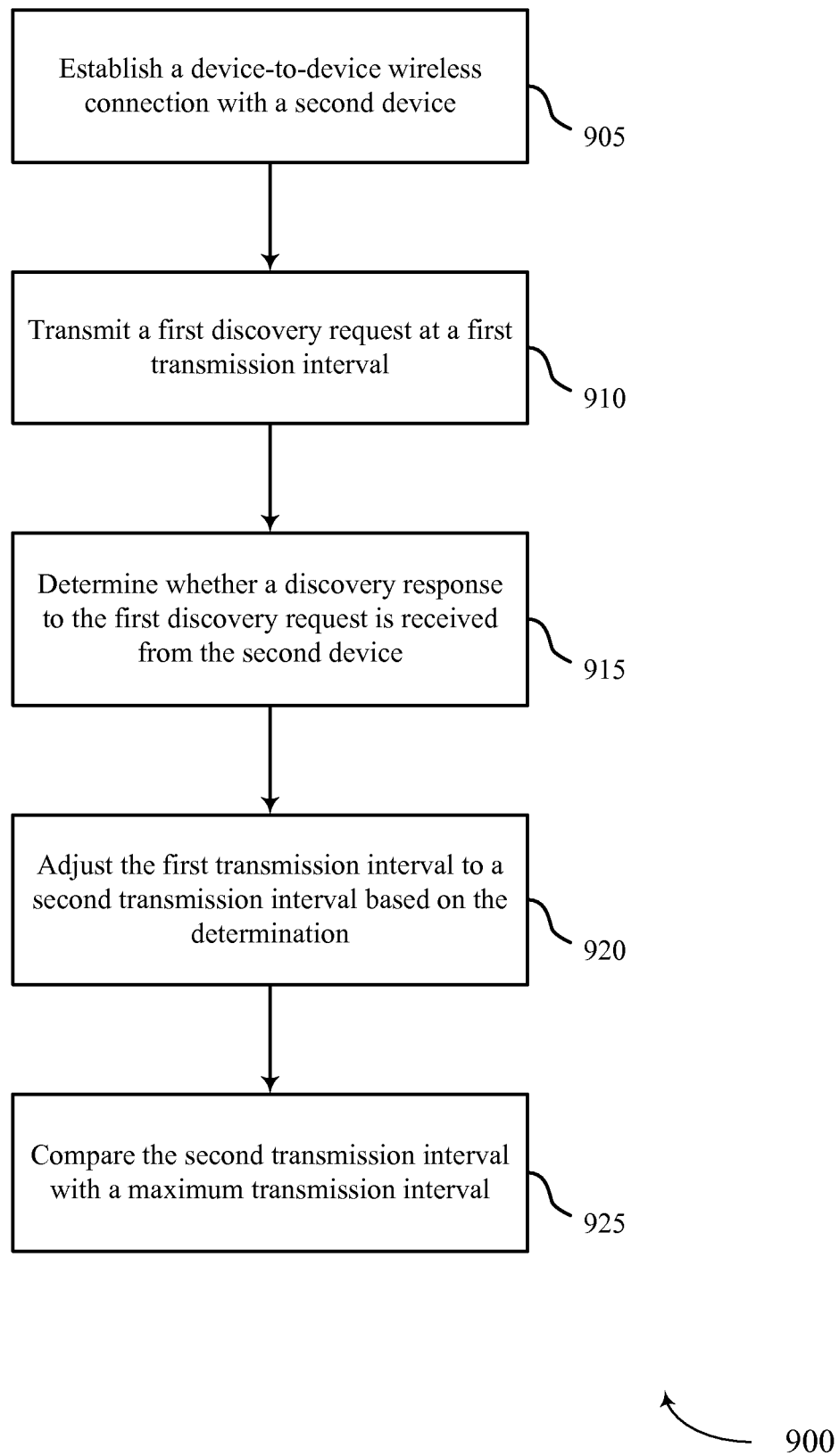

FIG. 9 shows a flowchart illustrating a method 900 for telescopic TDLS discovery in accordance with various aspects of the present disclosure. The operations of method 900 may be implemented by a STA 110 or its components as described with reference to FIGS. 1-7B. For example, the operations of method 900 may be performed by the TDLS discovery module 410 as described with reference to FIGS. 4-7B. A STA 110 may execute a set of codes to control the functional elements of the STA 110 to perform the functions described below. Additionally or alternatively, the STA 110 may perform aspects the functions described below using special-purpose hardware. The method 900 may also incorporate aspects of method 800 of FIG. 8.

At block 905, the STA 110 may establish a device-to-device wireless connection with a second device as described with reference to FIGS. 2-3. The operations of block 905 may be performed by the communications manager 505 as described with reference to FIG. 5.

At block 910, the STA 110 may transmit a first discovery request at a first transmission interval as described with reference to FIGS. 2-3. The operations of block 910 may be performed by the transmitter 415 as described with reference to FIG. 4.

At block 915, the STA 110 may determine whether a discovery response to the first discovery request is received from the second device as described with reference to FIGS. 2-3.

The operations of block 915 may be performed by the communications manager 505 as described with reference to FIG. 5.

At block 920, the STA 110 may adjust the first transmission interval to a second transmission interval based at least in part on the determination as described with reference to FIGS. 2-3. The operations of block 920 may be performed by the interval adjuster 510 as described with reference to FIG. 5.

At block 925, the STA 110 may compare the second transmission interval with a maximum transmission interval as described with reference to FIGS. 2-3. The operations of block 925 may be performed by the interval comparer 650 as described with reference to FIG. 6.

Figure 10:
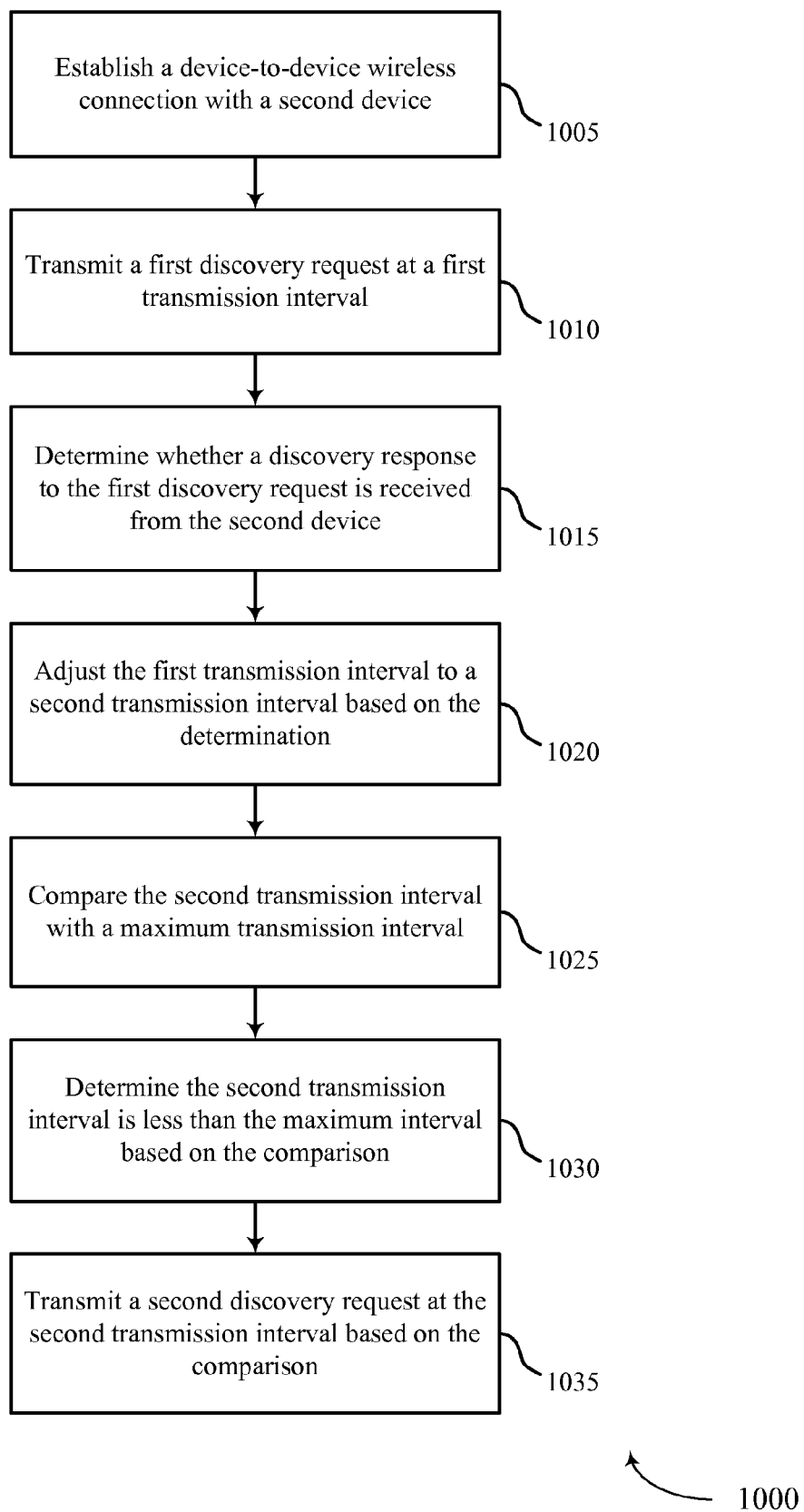

FIG. 10 shows a flowchart illustrating a method 1000 for telescopic TDLS discovery in accordance with various aspects of the present disclosure. The operations of method 1000 may be implemented by a STA 110 or its components as described with reference to FIGS. 1-7B. For example, the operations of method 1000 may be performed by the TDLS discovery module 410 as described with reference to FIGS. 4-7B. A STA 110 may execute a set of codes to control the functional elements of the STA 110 to perform the functions described below. Additionally or alternatively, the STA 110 may perform aspects the functions described below using special-purpose hardware. The method 1000 may also incorporate aspects of methods 800, and 900 of FIGS. 8-9.

At block 1005, the STA 110 may establish a device-to-device wireless connection with a second device as described with reference to FIGS. 2-3. The operations of block 1005 may be performed by the communications manager 505 as described with reference to FIG. 5.

At block 1010, the STA 110 may transmit a first discovery request at a first transmission interval as described with reference to FIGS. 2-3. The operations of block 1010 may be performed by the transmitter 415 as described with reference to FIG. 4.

At block 1015, the STA 110 may determine whether a discovery response to the first discovery request is received from the second device as described with reference to FIGS. 2-3. The operations of block 1015 may be performed by the communications manager 505 as described with reference to FIG. 5.

At block 1020, the STA 110 may adjust the first transmission interval to a second transmission interval based at least in part on the determination as described with reference to FIGS. 2-3. The operations of block 1020 may be performed by the interval adjuster 510 as described with reference to FIG. 5.

At block 1025, the STA 110 may compare the second transmission interval with a maximum transmission interval as described with reference to FIGS. 2-3. The operations of block 1025 may be performed by the interval comparer 650 as described with reference to FIGS. 6A-6B.

At block 1030, the STA 110 may determine the second transmission interval is less than the maximum interval based at least in part on the comparison as described with reference to FIGS. 2-3. The operations of block 1030 may be performed by the interval comparer 650 as described with reference to FIGS. 6A-6B.

At block 1035, the STA 110 may transmit a second discovery request at the second transmission interval based at least in part on the comparison as described with reference to FIGS. 2-3. The operations of block 1035 may be performed by the transmitter 415 as described with reference to FIG. 4.

Figure 11:
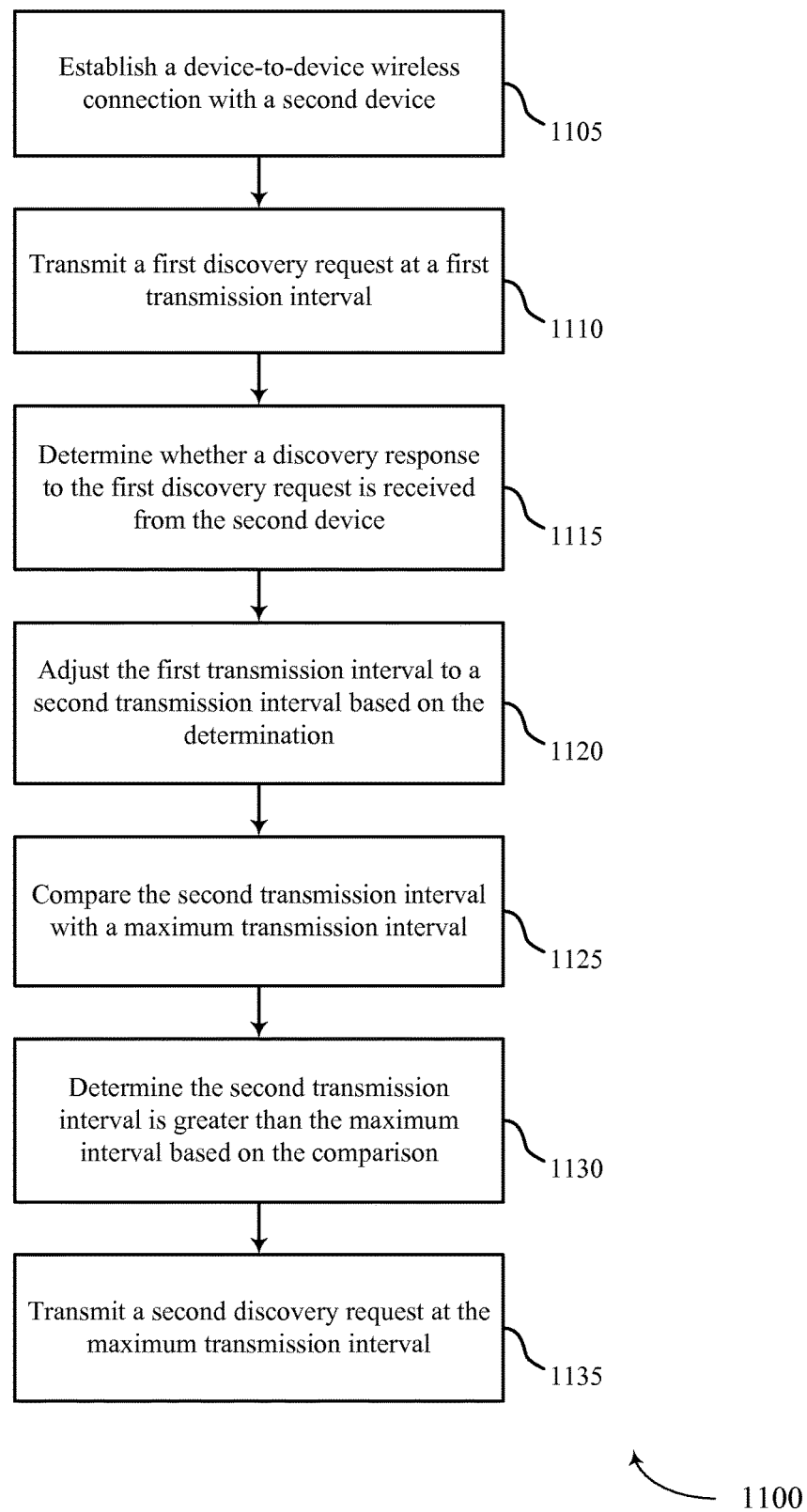

FIG. 11 shows a flowchart illustrating a method 1100 for telescopic TDLS discovery in accordance with various aspects of the present disclosure. The operations of method 1100 may be implemented by a STA 110 or its components as described with reference to FIGS. 1-7B. For example, the operations of method 1100 may be performed by the TDLS discovery module 410 as described with reference to FIGS. 4-7B. In some examples, a STA 110 may execute a set of codes to control the functional elements of the STA 110 to perform the functions described below. Additionally or alternatively, the STA 110 may perform aspects the functions described below using special-purpose hardware. The method 1100 may also incorporate aspects of methods 800, 900, and 1000 of FIGS. 8-10.

At block 1105, the STA 110 may establish a device-to-device wireless connection with a second device as described with reference to FIGS. 2-3. The operations of block 1105 may be performed by the communications manager 505 as described with reference to FIG. 5.

At block 1110, the STA 110 may transmit a first discovery request at a first transmission interval as described with reference to FIGS. 2-3. The operations of block 1110 may be performed by the transmitter 415 as described with reference to FIG. 4.

At block 1115, the STA 110 may determine whether a discovery response to the first discovery request is received from the second device as described with reference to FIGS. 2-3. The operations of block 1115 may be performed by the communications manager 505 as described with reference to FIG. 5.

At block 1120, the STA 110 may adjust the first transmission interval to a second transmission interval based at least in part on the determination as described with reference to FIGS. 2-3. The operations of block 1120 may be performed by the interval adjuster 510 as described with reference to FIG. 5.

At block 1125, the STA 110 may compare the second transmission interval with a maximum transmission interval as described with reference to FIGS. 2-3. The operations of block 1125 may be performed by the interval comparer 650 as described with reference to FIGS. 6A-6B.

At block 1130, the STA 110 may determine the second transmission interval is greater than the maximum interval based at least in part on the comparison as described with reference to FIGS. 2-3. The operations of block 1130 may be performed by the interval comparer 650 as described with reference to FIGS. 6A-6B.

At block 1135, the STA 110 may transmit a second discovery request at the maximum transmission interval as described with reference to FIGS. 2-3. The operations of block 1135 may be performed by the transmitter 415 as described with reference to FIG. 4.

Thus, methods 800, 900, 1000, and 1100 may provide for telescopic TDLS discovery. It should be noted that methods 800, 900, 1000, and 1100 describe possible implementation, and that the operations and the steps may be rearranged or otherwise modified such that other implementations are possible. In some examples, aspects from two or more of the methods 800, 900, 1000, and 1100 may be combined.

The detailed description set forth above in connection with the appended drawings describes examples and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the present disclosure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a first device, comprising:
   establishing a device-to-device wireless connection with a second device;
   transmitting a first discovery request at a first transmission interval, the first transmission interval comprising a discovery request time and a first wait time;
   determining whether a discovery response to the first discovery request is received from the second device;
   adjusting the first transmission interval to a second transmission interval based at least in part on the determination, the second transmission interval comprising the discovery request time and a second wait time;
   determining an inequality between the second transmission interval and a maximum transmission interval, the maximum transmission interval comprising the discovery request time and a third wait time; and
   transmitting a second discovery request at either the second transmission interval or the maximum transmission interval based at least in part on the determined inequality.

2. The method of claim 1, wherein the device-to-device wireless connection comprises a tunneled direct link setup (TDLS) connection.

3. The method of claim 1, wherein the second discovery request is transmitted at the second transmission interval based on a determination that the second transmission interval is less than the maximum transmission interval.

4. The method of claim 1, wherein the second discovery request is transmitted at the maximum transmission interval based on a determination that the second transmission interval is greater than the maximum transmission interval.

5. The method of claim 1, wherein the second transmission interval is a multiple of the first transmission interval.

6. The method of claim 1, wherein adjusting the first transmission interval is based at least in part on determining the discovery response is not received.

7. The method of claim 1, further comprising:
   determining the second device is out of a signaling range of the first device.

8. The method of claim 7, wherein transmitting the first discovery request is based at least in part on determining the second device is out of the signaling range of the first device.

9. The method of claim 1, wherein the first device and the second device are mobile stations (STAs).

10. The method of claim 1, wherein the first device and the second device operate within a wireless local area network (WLAN).

11. An apparatus for wireless communication, comprising:
    a communications manager for establishing, at a first device, a device-to-device wireless connection with a second device;
    a transmitter for transmitting a first discovery request at a first transmission interval, the first transmission interval comprising a discovery request time and a first wait time;
    wherein the communications manager further determines whether a discovery response to the first discovery request is received from the second device;
    an interval adjuster for adjusting the first transmission interval to a second transmission interval based at least in part on the determination, the second transmission interval comprising the discovery request time and a second wait time;
    an interval comparer for determining an inequality between the second transmission interval and a maximum transmission interval, the maximum transmission interval comprising the discovery request time and a third wait time; and
    a transmitter for transmitting a second discovery request at either the second transmission interval or the maximum transmission interval based at least in part on the determined inequality.

12. The apparatus of claim 11, wherein the device-to-device wireless connection comprises a tunneled direct link setup (TDLS) connection.

13. The apparatus of claim 11, wherein the second discovery request is transmitted at the second transmission interval based on a determination that the second transmission interval is less than the maximum transmission interval.

14. The apparatus of claim 11, wherein the second discovery request is transmitted at the maximum transmission interval based on a determination that the second transmission interval is greater than the maximum transmission interval.

15. The apparatus of claim 11, wherein the second transmission interval is a multiple of the first transmission interval.

16. The apparatus of claim 11, wherein the interval adjuster further adjusts the first transmission interval is based at least in part on determining the discovery response is not received.

17. The apparatus of claim 11, further comprising:
    an interval comparer for determining the second device is out of a signaling range of the first device.

18. The apparatus of claim 17, wherein the transmitter further transmits the first discovery request is based at least in part on determining the second device is out of the signaling range of the first device.

19. An apparatus for wireless communication, comprising:
    a processor;
    memory in electronic communication with the processor; and
    instructions stored in the memory and operable, when executed by the processor, to cause the apparatus to:
    establish, at a first device, a device-to-device wireless connection with a second device;
    transmit a first discovery request at a first transmission interval, the first transmission interval comprising a discovery request time and a first wait time;
    determine whether a discovery response to the first discovery request is received from the second device;
    adjust the first transmission interval to a second transmission interval based at least in part on the determination, the second transmission interval comprising the discovery request time and a second wait time;
    determine an inequality between the second transmission interval and a maximum transmission interval, the maximum transmission interval comprising the discovery request time and a third wait time; and
    transmit a second discovery request at either the second transmission interval or the maximum transmission interval based at least in part on the determined inequality.

20. The apparatus of claim 19, wherein the device-to-device wireless connection comprises a tunneled direct link setup (TDLS) connection.

21. The apparatus of claim 19, wherein the second discovery request is transmitted at the second transmission interval based on a determination that the second transmission interval is less than the maximum transmission interval.

22. The apparatus of claim 19, wherein the second discovery request is transmitted at the maximum transmission interval based on a determination that the second transmission interval is greater than the maximum transmission interval.

23. The apparatus of claim 19, wherein the second transmission interval is a multiple of the first transmission interval.

24. The apparatus of claim 19, wherein the instructions to adjust the first transmission interval comprise instructions operable to adjust the first transmission interval based at least in part on determining the discovery response is not received.

25. The apparatus of claim 19, wherein the instructions are operable to cause the processor to:
  determine the second device is out of a signaling range of the first device.

26. A non-transitory computer-readable medium storing code for wireless communication, the code comprising instructions executable by a processor to:
  establish, at a first device, a device-to-device wireless connection with a second device;
  transmit a first discovery request at a first transmission interval, the first transmission interval comprising a discovery request time and a first wait time;
  determine whether a discovery response to the first discovery request is received from the second device;
  adjust the first transmission interval to a second transmission interval based at least in part on the determination, the second transmission interval comprising the discovery request time and a second wait time;
  determine an inequality between the second transmission interval and a maximum transmission interval, the maximum transmission interval comprising the discovery request time and a third wait time; and
  transmit a second discovery request at either the second transmission interval or the maximum transmission interval based at least in part on the determined inequality.

27. The non-transitory computer-readable medium of claim 26, wherein the device-to-device wireless connection comprises a tunneled direct link setup (TDLS) connection.

28. The non-transitory computer-readable medium of claim 26, wherein the second discovery request is transmitted at the second transmission interval based on a determination that the second transmission interval is less than the maximum transmission interval.

29. The non-transitory computer-readable medium of claim 26, wherein the second discovery request is transmitted at the maximum transmission interval based on a determination that the second transmission interval is greater than the maximum transmission interval.

30. The non-transitory computer-readable medium of claim 26, wherein the instructions are further executable by the processor to:
  determine the second device is out of a signaling range of the first device, wherein transmitting the first discovery request is based at least in part on determining the second device is out of the signaling range of the first device.

* * * * *